United States Patent
Charaudeau et al.

[11] Patent Number: 6,161,844
[45] Date of Patent: Dec. 19, 2000

[54] SUSPENSION DEVICE COMPRISING A SPRING CORRECTOR

[75] Inventors: Jean-Jacques Charaudeau, Cottens; Daniel Laurent, Marly; Jean-Louis Linda, La Tour-de-Treme; Pierre Varenne, Neyruz, all of Switzerland

[73] Assignee: Conception et Developpement Michelin S.A., Givisiez, Switzerland

[21] Appl. No.: 09/078,674

[22] Filed: May 14, 1998

[30] Foreign Application Priority Data

May 16, 1997 [FR] France ................................ 97 06225

[51] Int. Cl.⁷ .................................................. B60G 17/02
[52] U.S. Cl. ...................... 280/5.515; 280/5.5; 280/124.1
[58] Field of Search .......................... 280/124.108, 124.1, 280/124.101, 124.179, 5.5, 5.515, FOR 164

[56] References Cited

U.S. PATENT DOCUMENTS

| | | |
|---|---|---|
| 3,049,359 | 8/1962 | Geyer . |
| 4,981,309 | 1/1991 | Froeschle et al. . |
| 5,066,041 | 11/1991 | Kindermann et al. . |
| 5,091,679 | 2/1992 | Murty et al. . |
| 5,301,111 | 4/1994 | Utsui et al. . |
| 5,322,321 | 6/1994 | Yopp . |
| 5,434,782 | 7/1995 | Henry . |
| 5,740,039 | 4/1998 | Hirahara et al. . |

FOREIGN PATENT DOCUMENTS

| | | |
|---|---|---|
| 0343809 | 11/1989 | European Pat. Off. . |
| 0363158 | 4/1990 | European Pat. Off. . |
| 0436870 | 7/1991 | European Pat. Off. . |
| 14 18751 | 10/1965 | France . |
| 26 26818 | 4/1986 | France ........................ 280/FOR 164 |
| 82 22 808 | 2/1983 | Germany . |
| 42 02 091 | 8/1992 | Germany . |
| 61-75008 | 4/1986 | Japan ........................ 280/FOR 164 |
| 4100717 | 4/1992 | Japan . |
| 10-96497 | 12/1967 | United Kingdom . |

*Primary Examiner*—Eric Culbreth
*Attorney, Agent, or Firm*—Baker Botts L.L.P.

[57] ABSTRACT

The suspension device controls the range of movement between a suspended point connected to the body 3 of a vehicle and a non-suspended point connected to a wheel 2 which includes an elastic link 1 mounted between said suspended and non-suspended points, the elastic link being essentially composed of a spring of stiffness K and predetermined length under a reference load and a reversible electric jack 5 acting parallel to the spring 4 in order to control the movements between said suspended and non-suspended points. The device controls the electric jack so that, based on a variation observed in the distance between the suspended and non-suspended points caused by relative displacement of the suspended and non-suspended points, regardless of the direction of displacement, it first follows the spring while supplying the electric jack 5 with electrical energy so that it develops a force oriented in the same direction as the displacement, and then releases the force developed by the electric jack 5 so as to cancel out the force within a predetermined relaxation time.

20 Claims, 3 Drawing Sheets

SUSPENSION DEVICE COMPRISING A SPRING CORRECTOR

SPECIFICATION

BACKGROUND OF THE INVENTION

The present invention relates to suspensions and, more particularly to suspensions for vehicles, such as sedans. More specifically, it concerns means used to allow motion between two points (a suspended point, connected for example to the body or chassis of a car, and a non-suspended point such as a point which is part of a wheel carrier) while striving to reduce any variations in the force developed by the suspension seen from the standpoint of the suspended point.

It is known that the suspension of a vehicle includes design features by means of which the displacement of a wheel or wheels of an axle with respect to the chassis (or with respect to the body of the vehicle) is guided, and it also includes means which provide the suspension with a certain degree of flexibility and damping. For purposes of convenience, the latter means can be referred to as the spring function and the damping function. More generally, these means act on the movements existing between the wheel and the chassis. It should be noted at the outset that throughout this document, in order to simplify our presentation, only the type of vehicle suspension referred to as the vertical type is considered. Of course, this particular context does not limit the invention, even though it constitutes a preferred area thereof.

A spring is calculated so as to support the load of the vehicle while maintaining a sufficient clearance between the vehicle and the ground. Due to the damping function, wheels equipped with tires tend to remain in continuous contact with the road when the suspension is subjected to stress by irregularities in the road. A shock absorber prevents any oscillations occurring following a disturbance from being maintained, such as oscillations of the wheel itself, which the tire cannot attenuate by itself with sufficient speed.

It is known that the design of a suspension is characterized by the search for a compromise between objectives which have the reputation of being contradictory, at least to a large extent: comfort and road holding. Numerous efforts have been made in order to find increasingly favorable compromises. In prior art, there are suspensions referred to as active or semi-active whose control has now been made possible by progress in electronics. In such suspensions, commands are transmitted by electric or electrohydraulic means in order to modify the flexibility and/or damping characteristics of the suspension on a real-time basis. This leads to the addition of an electronic regulation stage, with sensors and means for calculation, to conventional mechanical, pneumatic, or hydraulic devices, as well as electronically-controlled valves or servovalves, in order to transmit the commands for changing the characteristics to the mechanical devices responsible for the functioning of the suspension as such. For example, a valve in a shock absorber is opened or closed in order to modify the dissipation of energy it causes or a valve is opened or closed to put a supplementary hydropneumatic accumulator in or out of circuit in order to modify the overall stiffness of the spring.

Unfortunately, this makes the basic components of the suspension, i.e., the springs and the shock absorbers, much more complex. In addition, although it is desirable that the suspension be capable of instantaneously adapting its characteristics to modifications in road conditions encountered by the vehicle, the electronically-controlled valves or servovalves are responsible for a delay in changing the actual state of the characteristics of the suspension due to their response time. The use of electronically-controlled valves or servovalves thus imposes a technological limit which makes it impossible to achieve the desired reaction speed. It appears difficult to expect response times below one hundredth of a second.

This is the reason for which designers of active or semi-active suspensions develop regulation strategies which are capable of anticipation; the control of the suspension is based on measurements of the speed of the vehicle, the angle and/or rotation speed of the steering wheel, the braking pressure and/or rate of increase in braking pressure, and the degree and/or speed of depression of the accelerator pedal. These parameters make it possible to anticipate to the extent possible the probable movements of the body which would be caused by the actions of the driver by means of experimental observation of vehicle behavior.

Although this anticipation may be interesting to a certain degree, it remains insufficient for rapidly taking into account disturbances which are unrelated to the operation of the vehicle, such as disturbances resulting from the bumpy nature of the ground on which one is driving. This is why attempts have been made to more directly control the inherent characteristics of suspension devices using electricity. Unfortunately, there are few technological possibilities of modifying the force introduced by a shock absorber in this manner. Furthermore, there is no known simple method of directly adjusting the stiffness of a spring by means of an electric current, voltage, or electro-magnetic field. Nonetheless, it remains true that a suspension fundamentally comprises a spring. It is therefore also desirable to be able to act on the spring function in order to be able to improve comfort while maintaining driving safety, i.e., handling performance (and therefore permanent contact between the wheel and the ground, even under extreme conditions).

In addition, attempts have already been made to adopt means for acting on a suspension which are better suited for electrical control. US Pat. No. 5,060,959 presents an electrical actuator which acts in parallel to a pneumatic spring to control the movements of the wheel of the vehicle. Nevertheless, this control makes use of numerous sensors of forces and position, making its practical utilization somewhat problematic. In addition, it turns out that the electrical actuator always. behaves as a conventional shock absorber in the rebound phases of the suspension (a rebound is a movement of the wheel carrier away from the chassis) as it opposes the movement of the suspension. This approach is not satisfactory for improving vehicle comfort.

The prior art has therefore been faced with the choice of control parameters and the correct use of a multitude of signals felt to be necessary for correctly determining the attitude of a vehicle, and finally, although progress in electrical control has given rise to hopes for the past several years of progress in the area of vehicle suspension, there are still problems with mastering the characteristics of an active suspension.

SUMMARY OF THE INVENTION

The invention proposes an approach which, based on the observation that a conventional shock absorber is always detrimental to comfort, dispenses with attempts to control of the damping of the suspension in a more elaborate fashion.

The suspension according to the invention, which controls the range of motion between a suspended point and a non-suspended point, comprises an elastic link mounted between said suspended and non-suspended points, designed to exert a lifting force of a predetermined nominal value between said points. The elastic link is essentially composed of a spring of stiffness K and predetermined length under a reference load and a reversible electric jack acting parallel to the spring.

The suspension device according to the invention, which controls the range of movement between a suspended point and a non-suspended point, comprises an elastic link mounted between said suspended and non-suspended points, said elastic link being essentially composed of a spring and comprising a reversible electric jack acting parallel to the spring in order to control the movements between said suspended and non-suspended points, said device comprising means for controlling the electric jack so that, based on a variation observed in the distance between said suspended and non-suspended points caused by relative displacement of the suspended and non-suspended points, regardless of the direction of displacement, it first follows the deformation of the spring, i.e., follows the contour imposed by the road, while supplying the electric jack with electrical energy so that it develops a force oriented in the same direction as the displacement, and then releases said force developed by the electric jack so as to cancel out said force within a predetermined relaxation time.

The role of the electric jack is essentially to force the spring to follow variations in the distance between the suspended and non-suspended point as faithfully as possible, regardless of the direction of these variations (jounce and rebound). If this condition is achieved, the variation in the force acting on the body is zero. If there is no variation in force, there is no acceleration, and therefore no vertical movement of the body, thus providing increased comfort. Control of the electric jack makes it possible to achieve active control of the suspension. Indeed, the electric jack permanently acts as a spring corrector in order to radically limit force variations which would otherwise be imposed by the spring on the suspended mass under the action of external disturbances. The function of this spring corrector consists of modifying the reaction force which the spring would naturally have developed in response to a disturbance by applying a correction strategy in order to achieve the best comfort possible. The spring corrector is capable of modifying, on a real-time basis, the overall stiffness of the suspension in order to approach the ideal situation which would be provided by a zero-slope spring.

According to one embodiment, the invention may use a conventional spring dimensioned to support the static load of a vehicle. In this particular case, the value K is constant. The spring develops a reaction force acting on the body of the vehicle. Due to the spring, it should be noted that on mathematically flat ground and in the absence of any disturbance resulting from a maneuver of the vehicle, there is no need for any action of the electric jack in order to carry the load of the vehicle and therefore to maintain the attitude and trim of the body. Thus the suspension does not consume any energy at equilibrium.

In order to provide outstanding driving comfort, it would be desirable that the body undergo as little vertical acceleration as possible even when driving on a bumpy road. To put it another way, it would be desirable for the force exerted by the ground on the vehicle to be independent of the position of the wheel with respect to the body of the vehicle. The principle of the invention consists of permanently correcting the reaction due to the spring, using an electric jack acting parallel to the spring, by means of a force developed by the electric jack which is of an amplitude and sign such that the overall reaction of the suspension with respect to the body varies as little as possible. In other words, the overall characteristic resulting from the combined effects of the spring and the corrector always tends to be that of a zero-slope spring both in rebound and jounce. In this case, the device acts as a pure contour-following system. Letting K be the instantaneous value of the stiffness of the spring and Z the variation in the distance between the suspended and non-suspended points, the supply of electrical power to the electric jack is such that it develops a force $F=KZ$ (i.e., the force is proportional to the product of the stiffness of the spring and the variation in distance; if necessary, one may add a term which makes it possible to take into account the inertia of non-suspended masses, but this term is a second-order one and of course becomes increasingly negligible as the inertia is weaker). Therefore, during the phase in which the electric jack follows the displacement, it compensates for the variation in force exerted by the spring due to said variation in distance in order to maintain the relative position between the suspended and non-suspended points as imposed by said external stresses.

If the suspension did not make a correction in the following action explained above, it would be unstable, as it would be incapable of correctly adapting itself to variations in the static load of the vehicle or incapable of finding the equilibrium position of the spring defined by the static load following permanent modifications in the contour level of the road. In addition, it would constantly consume energy in order to maintain the force in the electric jack. This is why it is advantageous to introduce a relaxation of the force developed in the electric jack. This relaxation takes place with a time constant which is much larger than the pure contour-following reaction. This gives rise to a continuous tendency in the electric jack to return to its initial position.

DESCRIPTION OF THE DRAWINGS

The invention will be better understood based on the following description of an example which does not limit the invention, in reference to the attached drawings, in which.

DESCRIPTION OF PREFERRED EMBODIMENTS

Figure 1:
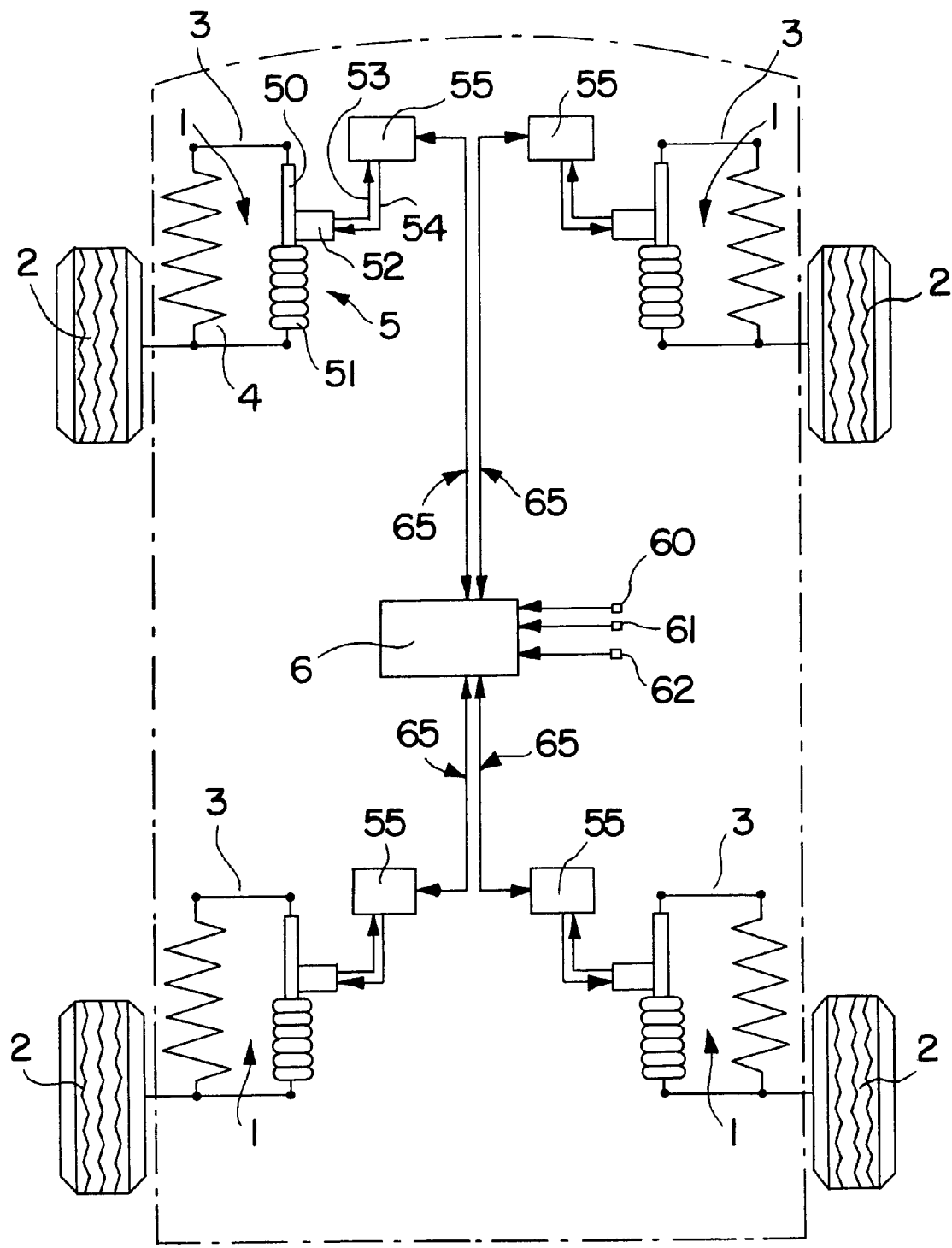
FIG. 1 shows a vehicle equipped with a suspension according to the invention.

FIG. 1 shows a vehicle equipped with four elastic links 1 mounted between the wheels 2 and the body 3. Each elastic link contains a helical spring 4 and an electric jack 5 mounted in parallel. The electric jack 5 is composed of a rack 50 sliding in a sleeve 51. An electric motor 52 is attached by its housing to the sleeve 51. A pinion (not shown) is mounted on the rotor of the engine and meshes with the rack 50.

In a particularly interesting variant of the invention, one uses an electric motor 52 of the synchronous auto-controlled type having an inductor with permanent magnets (i.e., an electronically commuted motor). This type of motor includes in its design rotor position sensors used to carry out control regardless of the application in question. When used in this application, these sensors actually measure the variation in distance between the wheel 2 and the body 3. One can control the suspension of one wheel without using any sensor other than those with which the motor 52 is equipped. We have seen that the force F to be developed in the electric jack is proportional to Z (said variation in distance). It is known that in order to obtain a given force in an electric jack 5 as described above, the motor must develop a specified torque. It is also known that this torque is proportional to the current supplied to the motor. Control in order to obtain a predetermined force therefore amounts to controlling the current to be supplied to the motor.

The information coming from internal sensors in the motor reaches a unit 55 for individual control of the wheels via the channel 53. The unit 55 contains a current supply unit and electronic means for using the information coming from said sensors inside the motor depending on a selected control strategy, i.e., first behavior as a contour-following device, which causes the electric jack 5 to develop a force, and then occurrence of relaxation of the force of the electric jack 5. Thus, the unit 55 supplies the appropriate current to the motor 52 via the electrical cable 54. The motor 52 then develops a force in the proper direction.

In order to explain the control of the electric jack 5, let us first assume that the device is attempting to achieve a state in which the body remains perfectly immobile, i.e., undergoes no vertical acceleration regardless of any stress originating from the wheels. In practice, if the wheel encounters an obstacle such as an uneven place in the road forming a bump, the wheel will tend to rise before the body of the vehicle, due to its inertia follows this rising movement. As soon as it is detected that the distance between the wheel and the chassis or body of the vehicle decreases, the electric jack is activated so that it compresses the spring while consuming the energy required for this purpose. Everything takes place as though the electric jack followed the rising movement of the wheel. This reaction of the electric jack may be extremely rapid. It only takes the time to establish the current required in the electric jack, i.e., is on the order of a millisecond, plus the calculation time of the control unit 55. Of course, if the distance between the body and the wheel tends to increase, the electric jack, as opposed to the previous situation, acts to contribute toward moving the wheel away from the body, possibly consuming the energy necessary for this purpose, i.e., for pushing the wheel, for example, into the bottom of a rut. Let us call this reaction of the electric jack a road contour-following reaction, i.e., a reaction following movements between suspended and non-suspended points.

Figure 2A:
FIGS. 2a–2c and FIGS. 3a–3c show the functioning of this suspension.
Figure 2B:
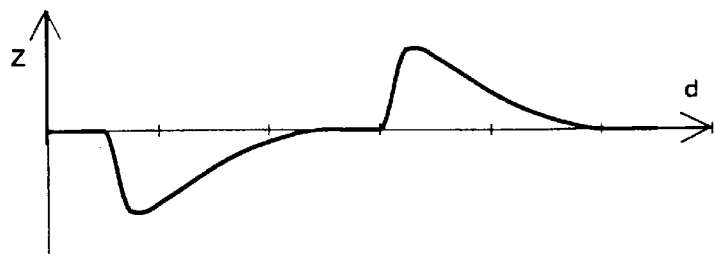
Figure 2C:
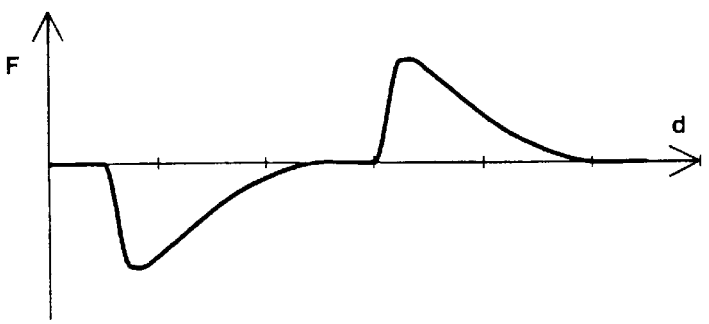
Figure 3A:
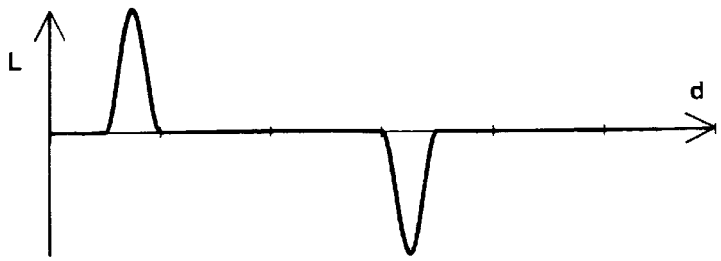
Figure 3B:
Figure 3C:
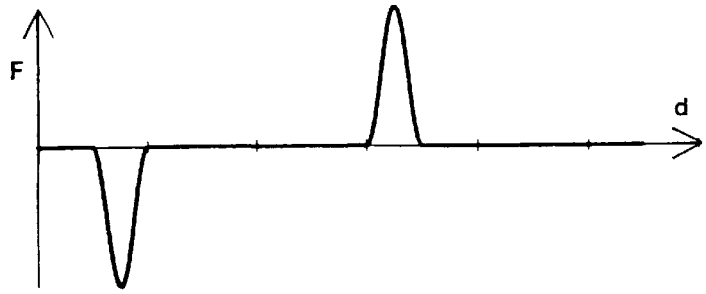

FIGS. 2a and 3a show the contour of the road. The horizontal axes "d" indicate displacement along the road. As a straight line, the horizontal axis represents a reference value determined by the average level of the road. The vertical axes "L" indicate the distance with respect to this average level. In this diagram, a curve therefore shows the course of the exact position of the surface of the road as a function of progress along the road. FIG. 2a shows a raised area of great length which would take a vehicle several seconds to cross. FIG. 3a shows a bump and a rut. In FIGS. 2b and 3b, the horizontal axes are those of FIGS. 2a and 3a, with the vertical axes "Z" representing the relative displacement between the suspended and non-suspended point, assumed to be negative for jounce (a movement of the wheel towards the chassis) of the suspension and positive for rebound (a movement of the wheel away from the chassis). In FIGS. 2c and 3c, the horizontal axes are those of FIGS. 2a and 3a, with the vertical axes "F" representing the force supplied by the electric jack 5, assumed to be positive for decompression of the spring 4 and negative for compression of the spring 4.

On the left side of FIGS. 2a–2c it can be seen that as soon as the wheel encounters an obstacle, a force arises in the electric jack 5 which compresses the spring 4, thus permitting the wheel 2 to rise up on the obstacle without the body 3 undergoing any variation in altitude with respect to the average level of the ground. This is the phase in which the variation in the relative position between the suspended point and non-suspended point is followed. At least at the beginning of the following reaction, the electric jack 5 can be controlled in order to overcompensate for this movement so as to nullify the delay due to detection. Nevertheless, it should be noted that the delay is less by at least one order of magnitude than the reaction time of the electronically-controlled valves or servovalves of active or semi-active hydraulic or pneumatic suspensions.

Next, the force developed in the electric jack is relaxed. One can see in, FIGS. 2a–2c with continuing displacement along the horizontal axis d, that as soon as the wheel 2 is located above the uneven place, the force of the electric jack 5 returns toward zero according to a time constant selected so that the variation in relative position between the suspended and non-suspended points resulting therefrom displaces the body upward, returning to the equilibrium position of the spring 4, which is a function of the static load of the vehicle, doing so sufficiently slowly so as not to adversely affect comfort.

On the right side of FIGS. 2a–2c we have shown what happens if the wheel 2 comes down from an uneven area of the same size. This functioning is symmetrical in its principle. The electric jack 5 forces the wheel 2 to remain flattened against the ground, developing a force which decompresses the spring 4; i.e., as is the case in a jounce phase, it moves the spring 4 away from its equilibrium position dictated by the static load of the vehicle and thus pushes the wheel 2, causing it to descend into the bottom of the rut or the bottom of the uneven place.

Next, and this is also symmetrical to what occurs when the initial stress causes excess compression of the spring 4, after the decompression phase of the spring 4, there is relaxation of the force developed in the electric jack 5. One can see in FIGS. 2a–2a, with continuing displacement along the horizontal axis d, that as soon as the wheel is located at the bottom of the uneven area, the force of the electric jack 5 returns toward zero according to the same relaxation time constant, returning to the equilibrium position of the spring 4, which is a function of the static load of the vehicle, doing so sufficiently slowly so as not to adversely affect comfort.

By means of the combined effect of the behavior dominating in the "contour-following" phase and then relaxation, the suspension absorbs the irregularities of the road, consuming a certain amount of electrical energy, while continuously and progressively tending to return to its initial equilibrium state in which the consumption of electrical energy is nullified.

In FIGS. 3a–3c, the variations imposed by the contour of the road reverse so rapidly that the phenomenon of relaxation does not have time to occur. The system acts as a pure contour-following system.

The control unit 55 includes means for calculation loaded with suitable programs for implementing this control strategy. The value of the stiffness K of the spring is stored in the unit 55 (here, this is a constant parameter), and said unit 55 receives, from the internal sensors in the motor via the channel 53, the information on the instantaneous measured position "$Z_{im}$" of the electric jack. The unit 55 continuously recalculates the equilibrium position, designated by $Z_0$ (the position in which the force of the spring 4 exactly compensates for the static load of the body), for example by averaging the value Z over a relatively long period of time (e.g., on the order of 10 seconds). Based on the information $Z_{im}$ and $Z_0$, one can immediately deduce the distance Z with respect to the equilibrium position, and one can calculate the force F to be applied, making it possible to immediately determine the current to be supplied to the motor 52. The unit 55 permanently recalculates said force F to be exerted according to a predetermined sampling period (for example, every 2 milliseconds). In the course of successive recalculations, the unit 55 introduces relaxation of the force, which can be carried out by different methods, provided that the result is to progressively reduce the proportion of force resulting from a previous disturbance.

A particular method is described below, and reference is made to FIG. 4, which shows one aspect of this particular method. On the left side of FIG. 4, one sees at the entry position the variable $Z_{im}$ obtained from measurement by the sensors integrated in the motor (instantaneous position $Z_{im}$). The function block 70 calculates the equilibrium position $Z_0$ (as indicated above). By comparing $Z_{im}$ and $Z_0$, one obtains the variable Z (distance with respect to the previous equilibrium position).

In order to relax the force of the jack, one may make an arrangement such that the means of control described above introduce attenuation of the following of said variation in distance by the electric jack 5. This attenuation in following the variation may take the form of a damping function. Control as a contour-following system is less pure. Partially and progressively, the jack takes on the functioning of a shock absorber. Nevertheless, and unlike in the case of conventional passive suspensions, no damping initially opposes the movement of the suspension; quite the contrary, as the electric jack even cancels out the reaction of the spring itself.

The purpose is therefore to control the electric jack so that it does not function as a pure contour-following device, i.e., so that its following of the variations in distance between the wheel and chassis is less exact. One thus creates an adjustment parameter referred to as α which can be adjusted on a real-time basis: the electric jack follows the variations in distance as precisely as possible, follows them only partially, or even opposes them. The controlling finction of the electric jack adjusts said parameter on a real-time basis in order to optimize vehicle comfort.

For example, therefore, again neglecting the inertia of non-suspended masses, the force F developed by the electric jack may be controlled by observing the following law:

$$F=[\alpha \cdot K \cdot Z]-[(1-\alpha) \cdot C \cdot dZ/dt]$$

with K being the stiffness of the spring, Z the variation of the distance between the suspended and non-suspended points, C the damping coefficient, and α the adjustment parameter for adjusting the suspension between functioning as a pure spring-following device (α=1) and a pure shock absorber (α=0). The parameter α takes on values less than 1 during the relaxation phase. These values are adjusted on a real-time basis as a function of the time constant desired for relaxation. At the end of relaxation, the parameter α returns to the value 1 and is ready to respond to a new stress from the road as a pure contour-following device.

Figure 4:
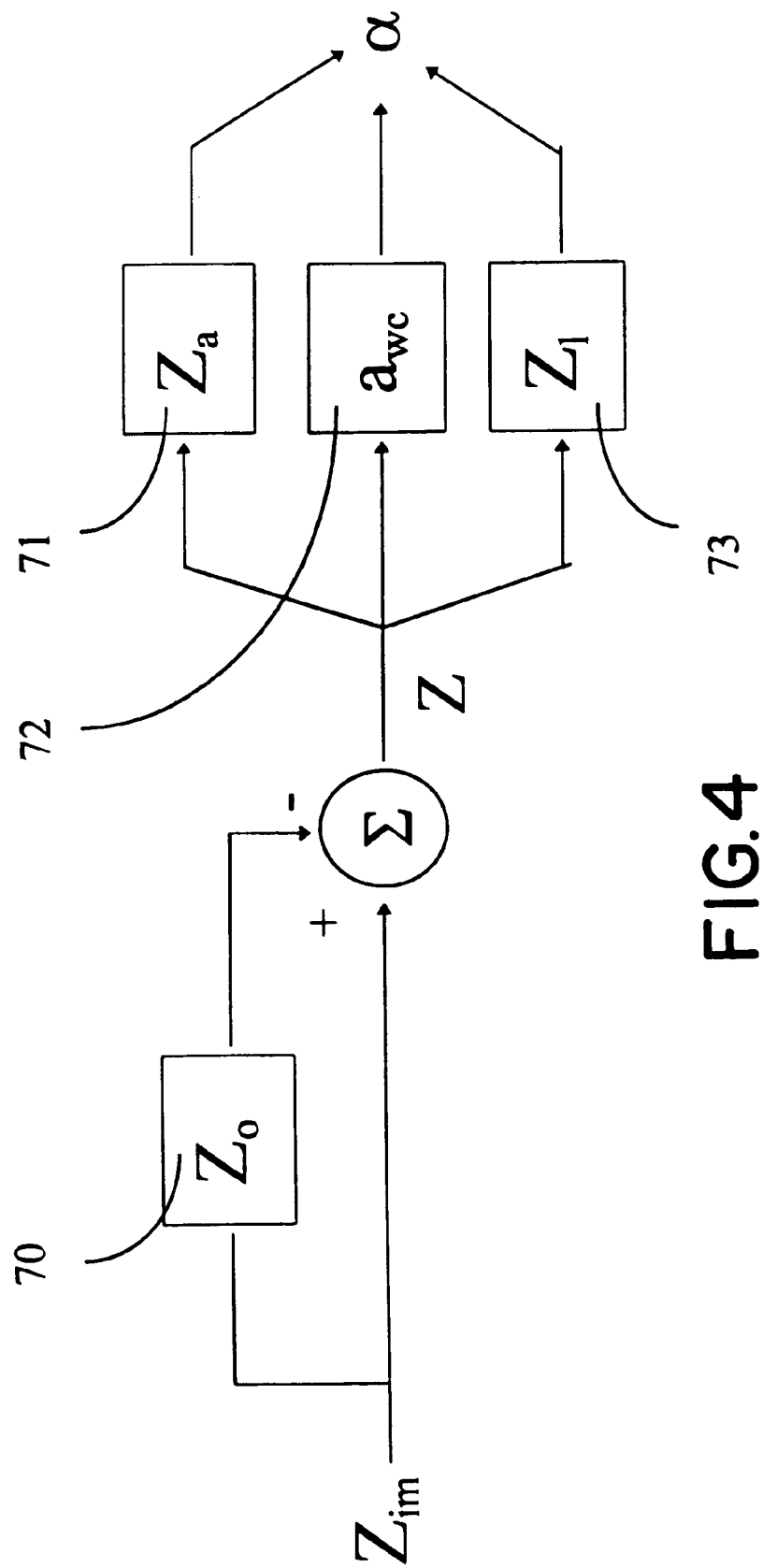
FIG. 4 is a block diagram explaining one aspect of the control of the electric jack.

FIG. 4 illustrates calculation on a real-time basis of parameter α. Based on the variable Z (distance with respect to the previous equilibrium position), one or more processing steps are carried out which make it possible to act on parameter α.

One of these processing steps concerns relaxation. In order to illustrate how said relaxation is implemented in the example described above, let us examine the case of a variation in the static load of a vehicle while control of the suspension is in operation (for example, an additional passenger gets into the vehicle with the engine running). Based on variable Z, a unit 71 calculates an average value $Z_a$ assumed by Z for a predetermined period of time which is far less than said time constant, for example on the order of a second, and if the unit 71 finds that $Z_a$ deviates from a zero value, the unit 71 gives α a value of less than 1, in this case preferably slightly less than 1, until the force of the jack 5 is nullified.

Therefore, the instantaneous value of the parameter α is a selected and predetermined function of the distance from the equilibrium position in which the spring 4 supports by itself the static load supported by the suspension device. Selection of this function makes it possible to adjust the behavior of the suspension.

According to the preceding, the suspension does not make a correction in the height of the body in reacting to the load transported by the vehicle. In order to make a correction in height, one must accept the continuous consumption of energy so that the percentage of the load exceeding the dead weight of the vehicle is supported by the electric jack, which is not incompatible with the principle according to the invention. Nevertheless, it appears to be preferable to dispense with correction of height or to reserve the function of height correction for a device other than said electric jack, said other device acting with a large time constant and consuming energy only during the correction phase.

Nevertheless, we should note that thanks to the principle of the invention, one may select a spring of fairly high stiffness K without an adverse effect on comfort, because the electric jack prevents the spring from abruptly transmitting to the body vertical acceleration caused by the level of the road. Wherefore, one may select a spring having a sufficiently high stiffness so that lowering of the vehicle under the effect of its maximum acceptable load remains minimal. The invention therefore makes it possible to reconcile high comfort of suspension with only minor lowering of the body, something which was not possible up to now without carrying out height correction.

This principle of controlling the suspension is particularly well-suited for tires of high inherent stiffness, for example, tires having an extremely low H/B ratio. A person skilled in the art is aware that this designation is used for tires of short size, i.e., tires whose lateral height H is fairly short with respect to their breadth B. It is known that these tires tend to be selected in order to impart to the vehicle highly responsive characteristics, and that they tend to have a detrimental effect on comfort. An interesting advantage of the present invention is that it makes it possible to use such tires having a low H/B ratio while still providing an extremely high level of comfort by means of the control mechanism described above.

It is also known that in certain cases, for example for extremely flexible tires having a large lateral height, the capacity of the tire to dampen its own vibrations may be insufficient, resulting in the well-known risk of oscillations due to the tire. Moreover, it is the role of the conventional shock absorber to dampen these oscillations in order to prevent the tire from losing contact with the ground (preventing oscillations due to the tire from being maintained).

The invention proposes to deal with this phenomenon in the following manner. It is known that maintenance of tire oscillations (or what takes their place in the link to the ground) are characterized by vibration of a resonance frequency which is a function of the stiffness and mass of the non-suspended part. Taking into account the fact that the inertia of non-suspended masses is always less than the inertia of a suspended mass, it may be considered that the body is immobile at or around said resonance frequency. It may be considered that variations in Z at or around said resonance frequency are due to the occurrence of tire resonance. For this reason, it may be considered that the amplitude "$a_{wc}$" of the acceleration of the wheel center reflects the amplitude of the tire oscillations (tire resonance).

A processing unit 72 carries out the second derivation of the signal Z with respect to time in order to obtain $a_{wc}$, which is an estimator of the movement range of the tire. Moreover, knowing the non-suspended mass and the stiffness of the tire makes it possible to establish predetermined reference values which allow one to decide what is normal, what is acceptable, and what is not for $a_{wc}$. For example, one cannot accept that the tire sags beyond a certain limit. Comparison of the amplitude $a_{wc}$ with said reference values makes it possible to rapidly assign to α a value which is sufficiently below 1 (for example, according to a linear variation law as a function of amplitude) in order to rapidly dampen the vibrations of the non-suspended mass and return to a value of 1 when said amplitude returns to an acceptable level.

The instantaneous value of parameter α is thus a finction of detection of the beginning of resonance of the tire, with control thus making it possible to always maintain contact with the ground and provide a high level of safety.

It is also known that, in the case of extremely flexible suspensions designed to favor comfort, one generally undergoes extreme rolling and pitching motions which very often bring the suspensions into an area of operation which is close to the limit of the movement range. In the prior art, these undesirable phenomena are combated by acting on positioning of suspension rods of the suspension and by using anti-rolling bars.

In the case of the suspension according to the invention, in order to avoid displacement toward functioning ranges which are too close to the limit of the range of motion, one may also attenuate the following reaction of the electric jack as described above, and this constitutes an additional optional aspect of processing, by acting on the parameter α if one observes that the range of motion of the suspension is approaching a limit. A processing unit 73 observes the approach of limits and varies the instantaneous value of the parameter α in order to set it at a value which is increasingly close to zero as the suspension device is displaced toward functioning ranges which are increasingly close to a limit of the range of movement, with a return to a value of 1 when one moves away from these limits. It should be noted that this option may be implemented using a supplementary sensor which senses the approach of limits. Alternatively, based on an approximate evaluation based solely on the analysis of Z, and taking into account the known course of the suspension, one may obtain a signal $Z_1$ representing the approach of the limits. Although there is an error of zero in this case, this simplified approach turns out to be sufficient when the thickness of the spring is high (little change of clearance on the ground under a load, see the discussion of the variation in height under the effect of static load).

Thus, there may be phases of functioning in which the force exerted by the electric jack 5 is in the opposite direction to its movement. Although such functioning is similar to damping, it is control which determines on a real-time basis the proportion of deadening desired for the choice of the value of parameter α as explained above. This control depends on the conditions of functioning of the suspension as they are imposed by rolling of the vehicle. It does not depend on an intrinsic parameter of the suspension, such as differentiation between a jounce and a rebound.

As an electric jack is introduced which actively participates in the functioning of the suspension, one can no longer distinguish a spring and a shock absorber in isolation. It has been explained above (see section on correction of height) that the flexibility of the suspension perceived in the body of the vehicle has more than one link with the stiffness K of the spring. In the same manner, the proportion of damping depends on control of the electric jack. The electric jack is an actuator placed in parallel to the spring and whose real-time control determines the characteristics of the suspension at any given time.

Individual control of each wheel 2 carried out by the control unit 55 whose functioning has been explained above is capable in and of itself of providing a comfortable and reliable suspension for a vehicle. Nevertheless, one may optionally add other levels of control so that the unit 55 may, if applicable, be part of more sophisticated regulation linking the behavior of the suspensions of the different wheels among themselves, for example, in order to make a correction in rolling and/or pitching of the vehicle. In this case, one may use sensors 60, 61, 62 installed outside the electric jacks 5 of each wheel, such as accelerometers connected to the body, or one may also use control strategies which observe the actions of the driver of the vehicle such that these make it possible to anticipate movements of the body. The required calculation means are installed in a central command unit 6 which exchanges information with the units 55 via lines 65. This leads to acting on the means of individual control of each wheel in order to modify the force developed by the electric jack with respect to what is calculated by individual control of each wheel.

Finally, we should point out that it is of course desirable that each electric jack be capable of providing a safe functioning in the case of a malfunctioning of any of the units 55 and/or the central unit 6. In this case, the supply terminals of the inductor of the motor 52 are connected, for example, in a short-circuit or to a resistor of appropriate dissipation, which makes the motor 52 function as a generator, with dissipation of energy due to the Joule effect resulting from the circulation of current. In this case, the suspension becomes purely passive.

We claim:

1. A suspension device which controls the range of movement between a suspended point and a non-suspended point, comprising an elastic link mounted between said suspended and non-suspended points, said elastic link including a spring and a reversible electric jack acting parallel to the spring in order to control the movements between said suspended and non-suspended points, and means for controlling the electric jack so that, based on a variation in the distance between said suspended and non-suspended points caused by relative displacement of the suspended and non-suspended points, regardless of the direction of displacement, the electric jack first follows the direction of the deformation of the spring caused by a change in the contour of the road, while supplying the electric jack with electrical energy so that it develops a force oriented in the same direction as the direction of the deformation of the spring caused by said change in the contour of the road, and then the means for controlling the electric jack reduces said force developed by the electric jack so as to cancel out said force due to said variation in the distance within a predetermined relaxation time.

2. A device according to claim 1 in which K is an instantaneous value of the stiffness of a spring and Z the variation in distance between the suspended and non-suspended points, the supply of power to the electric jack is such that it develops a force F=KZ so that, during a phase in which the jack follows displacement, it compensates for the variation in the force exerted by the spring due to said variation in distance so as to maintain the relative position between the suspended and non-suspended points as imposed by said external forces.

3. A device according to claim 1, in which the control means introduces attenuation of the following of said variation in distance by the electric jack.

4. A device according to claim 2, in which, α being an attenuation parameter ranging from 0 to 1, the force developed by the jack has the value of F=[α·K·Z]−[(1−α)·C·dZ/dt], with C being a damping coefficient.

5. A device according to claim 4 for suspending a chassis from at least one tire, in which an instantaneous value of parameter α is a function of the detection of beginning of resonance of the tire.

6. A device according to claim 4, in which an instantaneous value of the parameter α is a function of the moving away of the equilibrium position in which the spring supports by itself the static load supported by the suspension device, and is increasingly close to 0 as the suspension device moves toward functioning ranges which are close to a limit of the range of motion.

7. A device according to claim 4, in which an instantaneous value of parameter α is a function of the time constant desired for relaxation of the force of the spring.

8. A device according to claim 1, in which the electric jack comprises a permanent magnet, synchronous auto-controlled electric motor and in which the means of control determine the variation in relative position between the suspended and non-suspended points based entirely on a measurement of the variation in position emitted by sensors integrated with the electric motor.

9. A device according to claim 1, used for vertical suspension between a wheel of a vehicle and a chassis to which the wheel is connected.

10. A vehicle suspension device comprising a plurality of wheels each being connected to a chassis by a suspension device according to claim 1, in which said controlling means includes individual control means for each wheel and including an overall level of suspension control which, based on information estimating the attitude of the vehicle, acts on the individual control means for each wheel to modify the force developed by the electric jack with respect to what is determined by the individual control means of each wheel.

11. A suspension device as set forth in claim 1 in which the control means includes means to receive successive information on the position of the electric jack and to calculate a current to be supplied to the electric jack to restore equilibrium following a change in the contour of the road which varies the distance between the suspended and non-suspended points.

12. A suspension device which controls the range of movement between a suspended point and a non-suspended point, comprising an elastic link mounted between said suspended and non-suspended points, said elastic link including a spring and a reversible electric jack acting parallel to the spring, said elastic link having a base distance between the suspended point and the non-suspended point for which the spring develops a spring static load force corresponding to a static load acting on said suspension device, said electric jack controlling the movements between said suspended and non-suspended points, said suspension device having means for controlling the electric jack, said means continuously recalculating a current to be supplied to said electric jack according to a predetermined sampling period so that, based on a variation observed in the distance between said suspended and non-suspended points with respect to said base distance, regardless of the direction of said variation, the electric jack develops a correcting force oriented in the same direction as said variation, the magnitude of said correcting force:

being a finction of said variation observed in the distance between said suspended and non-suspended points with respect to said base distance; and being reduced in order to be cancelled out within a predetermined relaxation time occurring within a number of sampling steps.

13. A device according to claim 12, in which K is an instantaneous value of the stiffness of a spring, Z is the variation in distance between the suspended and non-suspended points and the supply of power to the electric jack is such that it develops a force F=K·Z.

14. A device according to claim 12, in which α is an attenuation parameter ranging from 0 to 1, and the force developed by the jack has the value of F=[α·K·Z]−[(1−α)·C·dZ/dt], with C being a damping coefficient.

15. A device according to claim 14 for suspending a chassis from at least one tire, in which an instantaneous value of parameter α is a function of the detection of the beginning of resonance of the tire.

16. A device according to claim 14, in which an instantaneous value of the parameter α is a function of the moving away of the equilibrium position in which the spring supports by itself the static load supported by the suspension device and is increasingly close to 0 as the suspension device moves toward functioning ranges which are close to a limit of the range of motion.

17. A device according to claim 14, in which an instantaneous value of parameter α is a function of the time constant desired for relaxation of the force of the spring.

18. A device according to claim 12, in which the electric jack comprises a permanent magnet synchronous auto-controlled electric motor and in which the means of control determine the variation in relative position between the suspended and non-suspended points based entirely on a measurement of the variation in position emitted by sensors integrated with the electric motor.

19. A device according to claim 12, used for vertical suspension between a wheel of a vehicle and the chassis to which the wheel is connected.

20. A vehicle suspension device comprising a plurality of wheels each being connected to a chassis by a suspension device according to claim 12, in which said controlling means includes individual control means for each wheel and including an overall level of suspension control which, based on information estimating the attitude of the vehicle, acts on the individual control means for each wheel to modify the force developed by the electric jack with respect to what is determined by the individual control means of each wheel.

* * * * *